(12) United States Patent
Jang et al.

(10) Patent No.: US 10,178,311 B2
(45) Date of Patent: Jan. 8, 2019

(54) DISPLAY APPARATUS WITH A CAMERA AND CONTROL METHOD THEREOF

(71) Applicant: SAMSUNG ELECTRONICS CO., LTD., Suwon-si, Gyeonggi-do (KR)

(72) Inventors: Young-ick Jang, Seoul (KR); Se-jun Kim, Suwon-si (KR); Chang-yong Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/091,318

(22) Filed: Apr. 5, 2016

(65) Prior Publication Data

US 2016/0219219 A1 Jul. 28, 2016

Related U.S. Application Data

(63) Continuation of application No. 13/921,236, filed on Jun. 19, 2013, now Pat. No. 9,332,176.

(30) Foreign Application Priority Data

Jul. 6, 2012 (KR) ........................ 10-2012-0074218

(51) Int. Cl.
*H04N 5/232* (2006.01)
*H04N 5/64* (2006.01)
(Continued)

(52) U.S. Cl.
CPC ......... *H04N 5/23241* (2013.01); *G06F 3/167* (2013.01); *H04N 5/23216* (2013.01);
(Continued)

(58) Field of Classification Search
CPC ........... H04N 5/23241; H04N 5/23216; H04N 7/142; H04N 5/23222; H04N 5/64; H04N 21/4223; G06F 3/167
See application file for complete search history.

(56) References Cited

U.S. PATENT DOCUMENTS 6,812,958 B1 * 11/2004 Silvester ............... G06F 1/1607
348/207.1
6,996,424 B2 2/2006 Ijas et al.
(Continued)

FOREIGN PATENT DOCUMENTS

CN 101086611 12/2007
CN 201054660 4/2008
(Continued)

OTHER PUBLICATIONS

European Search Report dated Jun. 6, 2014 in corresponding European Patent Application No. 13174119.1.
(Continued)

*Primary Examiner* — Gevell Selby
(74) *Attorney, Agent, or Firm* — Staas & Halsey LLP

(57) ABSTRACT

A display apparatus and a control method thereof include a display and a camera configured to be provided at an upper portion of the display apparatus to generate an image signal, the camera being movable to an up position or a down position. Also included are a voice sensor configured to receive a voice of a user, a power supply configured to supply electric power to the camera and a controller configured to control the camera to generate the image signal when the camera is in the up position. The controller is also configured to control the camera to disable the generation of the image signal and to output a message indicating that the camera is in the down position, when the camera is in the down position.

20 Claims, 13 Drawing Sheets

(51) Int. Cl.
*H04N 21/4223* (2011.01)
*H04N 7/14* (2006.01)
*G06F 3/16* (2006.01)

(52) U.S. Cl.
CPC ........... *H04N 5/23222* (2013.01); *H04N 5/64* (2013.01); *H04N 7/142* (2013.01); *H04N 21/4223* (2013.01)

(56) References Cited

U.S. PATENT DOCUMENTS

| | | | |
|---|---|---|---|
| 7,557,851 | B2 | 7/2009 | Ohashi et al. |
| 7,677,815 | B2 * | 3/2010 | Lane ................. G03B 17/04 348/373 |
| 7,871,209 | B1 * | 1/2011 | Sampathkumaran .. G03B 17/00 396/448 |
| 2002/0093583 | A1 * | 7/2002 | Ito ................... H04N 1/00236 348/373 |
| 2004/0012701 | A1 | 1/2004 | Nagai et al. |
| 2004/0100575 | A1 | 5/2004 | Malzbender |
| 2011/0050910 | A1 * | 3/2011 | Fan ................... H04N 5/2252 348/207.1 |
| 2011/0109785 | A1 * | 5/2011 | Fukuma ............. H04N 5/2251 348/333.06 |
| 2011/0281618 | A1 | 11/2011 | Chambers et al. |
| 2012/0189265 | A1 | 7/2012 | Okazaki et al. |

FOREIGN PATENT DOCUMENTS

| | | |
|---|---|---|
| GB | 2413235 | 10/2005 |
| JP | 10-75287 | 3/1998 |
| JP | 2006-270987 | 10/2006 |
| KR | 10-2005-0031012 | 4/2005 |
| KR | 10-2005-0100564 | 10/2005 |

OTHER PUBLICATIONS

European Office Action dated Dec. 21, 2015 in corresponding European Patent Application No. 13174119.1.
U.S. Office Action dated Sep. 15, 2014 in copending U.S. Appl. No. 13/921,236.
U.S. Office Action dated Jan. 26, 2015 in copending U.S. Appl. No. 13/921,236.
U.S. Office Action dated Jul. 30, 2015 in copending U.S. Appl. No. 13/921,236.
U.S. Notice of Allowance dated Dec. 30, 2015 in copending U.S. Appl. No. 13/921,236.
U.S. Appl. No. 13/921,236, filed Jun. 19, 2013, Young-ick Jang, Samsung Electronics Co., Ltd.
Chinese Office Action dated Jul. 5, 2017 in corresponding Chinese Patent Application No. 201310278259.8, 9 pages.
Korean Office Action dated Jun. 18, 2018 in Korean Patent Application No. 10- 2012-0074218.

* cited by examiner ately protrude from the display apparatus, and may
DISPLAY APPARATUS WITH A CAMERA AND CONTROL METHOD THEREOF

CROSS-REFERENCE TO RELATED APPLICATIONS

This application is a continuation of U.S. patent application Ser. No. 13/921,236 filed on Jun. 19, 2013 which claims priority from Korean Patent Application No. 10-2012-0074218, filed on Jul. 6, 2012 in the Korean Intellectual Property Office, the disclosure of which is incorporated herein by reference.

BACKGROUND

1. Field

Apparatuses and methods consistent with the exemplary embodiments relate to a display apparatus and a control method thereof, and more particularly to a display apparatus with a camera for image communication and a control method thereof.

2. Description of the Related Art

A display apparatus such as a television (TV) may be provided with an image communication camera for image communication between users. The image communication camera may include an image sensor for sensing an image and a microphone for acquiring a voice.

In general, the display apparatus with such an image communication camera is designed to maintain an activated state where electric power is supplied to the image sensor and the microphone, if the display apparatus receives electric power.

Thus, even when a user does not use the image communication camera, the electric power may be wastefully supplied to it. Further, it is difficult for a user to recognize whether the image communication camera is operating or not.

Also, the image communication camera may be remotely used to observe a user's home without his/her intended permission by hacking or the like, thereby causing invasion of privacy.

SUMMARY

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

One or more exemplary embodiments may provide a display apparatus that may include: an image communication camera which may include an image sensor to sense an image passed through a lens, may be installed to be movable up and down at an upper portion of the display apparatus, and may upwardly and outwardly protrude from the display apparatus as moved up when being in use; an image processor which may process an image signal corresponding to an image sensed by the image sensor; a display which may display an image the processed image signal; a sensor which may sense whether the image communication camera is moved up or down; a power supply which may supply electric power to components of the display apparatus; and a controller which may control the power supply to supply electric power to the image communication camera if the sensor senses that the image communication camera is moved up, and cut off the electric power to the image communication camera if the sensor senses that the image communication camera is moved down.

The display apparatus may further include a voice sensor to receive voice, and the controller may control the power supply to supply electric power to the voice sensor if the sensor senses that the image communication camera is moved up, and cut off the electric power to the voice sensor if the sensor senses that the image communication camera is moved down.

The display apparatus may further include an insertion unit at the upper portion of the display apparatus, in which the image communication camera may be moved down and inserted, and an elastic member coupled to the insertion unit and the image communication camera, and the image communication camera may be moved up and down by a push input of a user to a top of the image communication camera.

The display apparatus may further include a holding unit provided at a bottom of the image communication camera, which may be coupled to the insertion unit when the image communication camera is moved down, and which may hold the image communication camera. The sensor may sense whether the image communication camera is moved up or down in accordance with the coupling of the holding unit.

The holding unit may include a latch provided in the bottom of the image communication camera, and a latch holder provided in the insertion unit and coupled to the latch. The sensor may include a switching unit which may be turned on/off in accordance with whether the latch and the latch holder are coupled or not.

The insertion unit may include a guide portion via which the image communication camera slides, the guide portion being provided with a gear, and the image communication camera may be laterally provided with a damper positioned corresponding to the gear, the damper rotating while being engaged with the gear.

The controller may control the display to display a user interface (UI) showing operation states of the image communication camera in accordance with the supply or cut-off of electric power to the image communication camera.

The controller may control the display to display menu items for setting up a privacy protection mode in which the electric power supplied to the image communication camera is cut off, and may control the power supply in accordance with a user's selection to the menu items.

The controller may enter a sleep mode when the image communication camera is moved down.

The image communication camera may be installed in an upper back of the display apparatus.

One or more exemplary embodiments may provide a method of controlling a display apparatus including an image communication camera, the method which may include: sensing whether the image communication camera, which may be installed to be movable up and down at an upper portion of the display apparatus and which may upwardly and outwardly protrude from the display apparatus as moved up when being in use, is moved up or down; and cutting off electric power supplied to the image communication camera if the image communication camera is moved down, in accordance with sensing results.

The method may further include supplying the electric power to the image communication camera if the image communication camera is moved up.

The display apparatus may further include a voice sensor to receive voice, the cutting off the electric power may include cutting off the electric power supplied to the voice acquiring unit, and the supplying the electric power may include supplying the electric power to the voice acquiring unit.

The method may further include displaying a user interface (UI) showing operation states of the image communication camera in accordance with the supply or cut-off of electric power to the image communication camera.

The method may further include displaying menu items for setting up a privacy protection mode, in which the electric power supplied to the image communication camera is cut off when the image communication camera is moved down, and receiving a user's selection to the menu items.

The method may further include sensing an image passed through a lens of the image communication camera; processing an image signal corresponding to the sensed image; and displaying an image based on the processed image signal.

The display apparatus may enter a sleep mode when the image communication camera is moved down.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION

Figure 1:
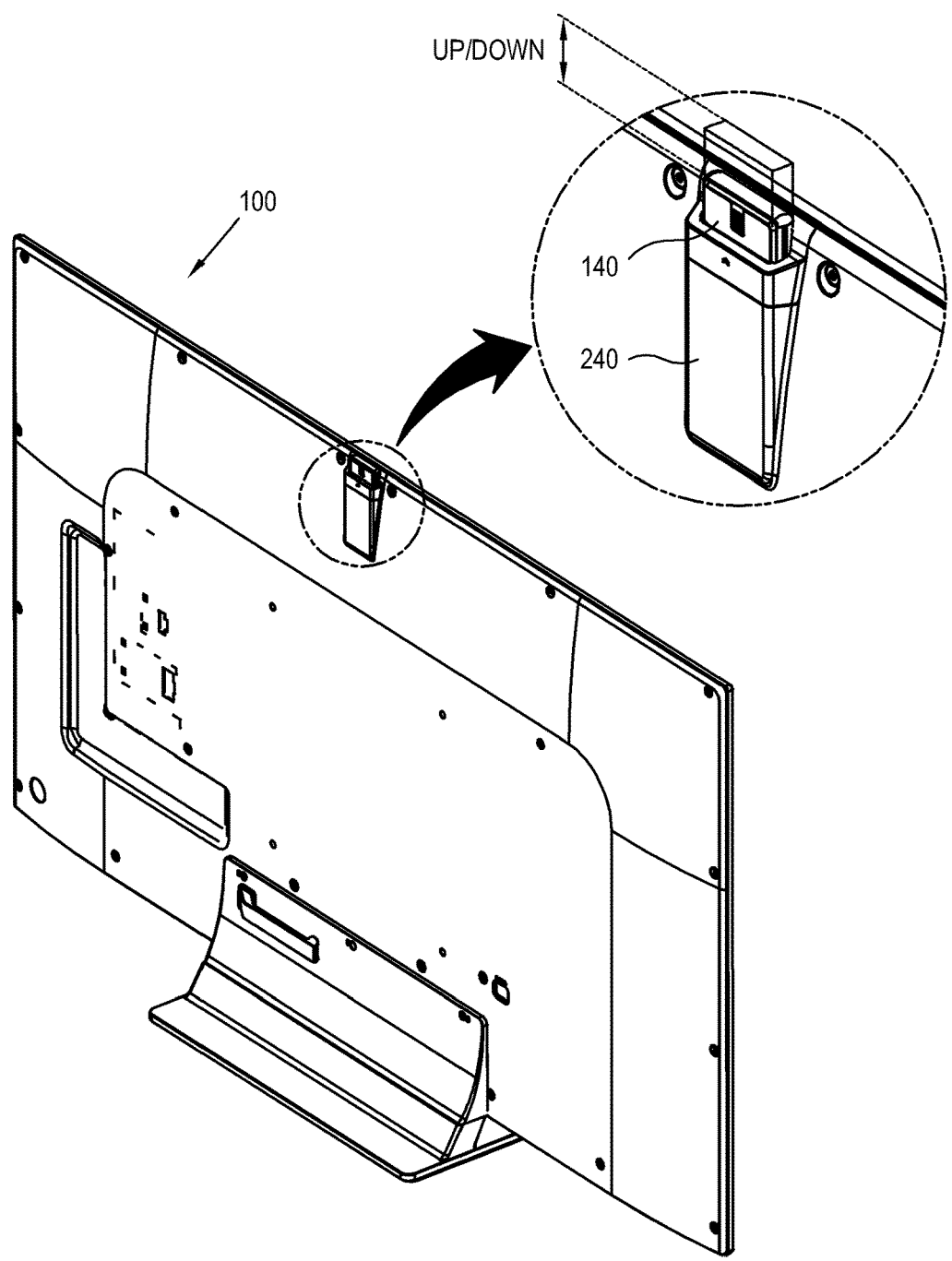
FIG. 1 shows an example of a display apparatus according to one or more exemplary embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

FIG. 1 shows an example of a display apparatus 100 according to one or more exemplary embodiments.

As shown in FIG. 1, the display apparatus 100 may be provided with an image communication camera 140. The image communication camera 140 according to one or more embodiments may be installed in an upper back of the display apparatus 100 and may be movable up and down. While being used (i.e., operated), the image communication camera 140 may move up and may protrude outward from a top of the display apparatus 100. The upper back of the display apparatus 100 may be provided with an insertion portion 240 in which the image communication camera 140 may be accommodated when the image communication camera 140 moves down.

FIG. 1 shows an example in which the image communication camera 140 is installed in the upper back of the display apparatus 100, but the embodiments are not limited thereto. Alternatively, for example, the image communication camera 140 may have a structure for up/down sliding and thus may be installed so that it can protrude outward.

In this embodiment, the display apparatus 100 may have a structure that the image communication camera 140 may come out only when it is used. Therefore, a user may intuitively know whether the image communication camera 140 is operating or not.

Figure 2:
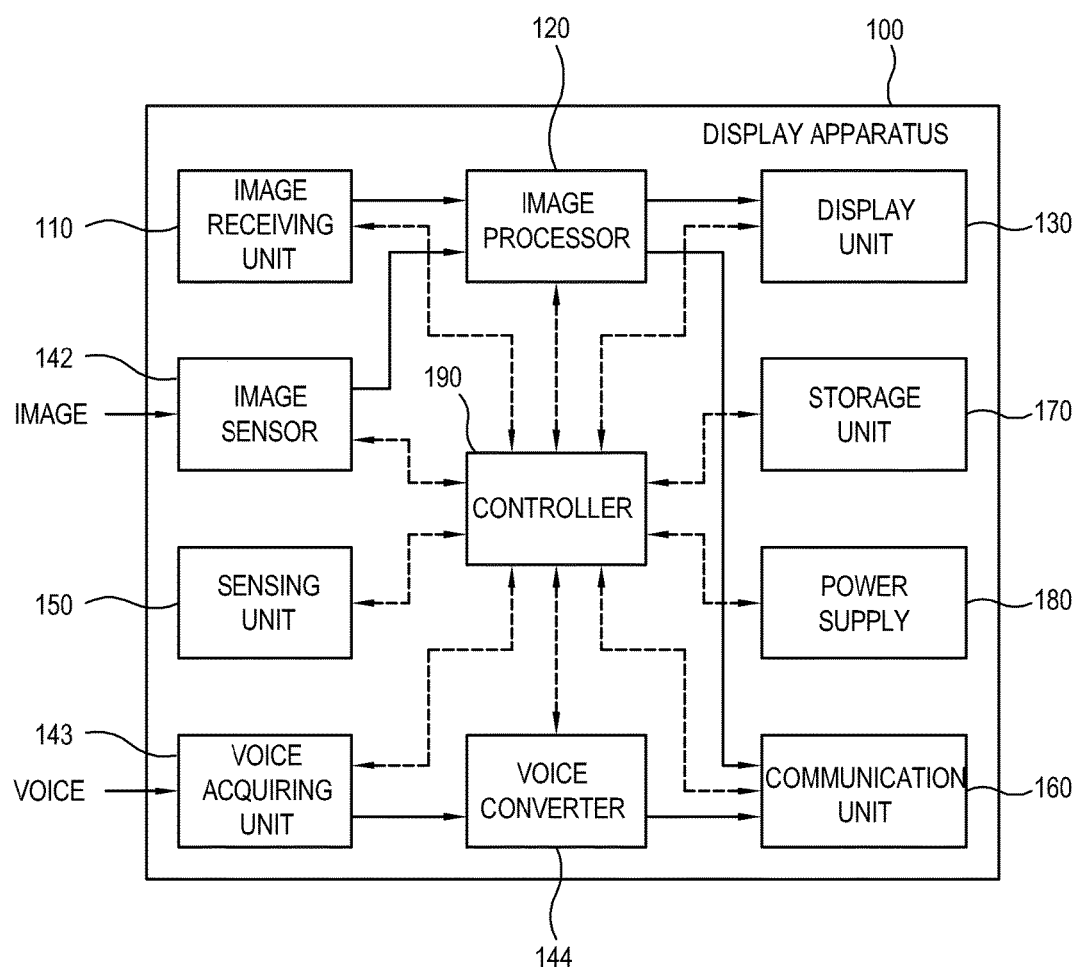
FIG. 2 is a block diagram showing a configuration of a display apparatus according to one or more embodiments, such as the display apparatus of FIG. 1.

FIG. 2 is a block diagram showing a configuration of a display apparatus according to one or more embodiments, such as the display apparatus 100.

As shown in FIG. 2, the display apparatus 100 may process an image signal provided by an external image source (not shown) in accordance with preset image processing, and may display it as an image.

One or more embodiments will be described by way of an example where the display apparatus 100 is a television (TV) for processing a broadcasting image based on a broadcasting signal/broadcasting information/broadcasting data received from a transmitter of a broadcasting station. However, the embodiments are not limited to this example of the display apparatus 100. Alternatively, for example, the display apparatus 100 may be applied to not only the TV but also various examples such as a monitor, etc.

Also, the kind of images displayable by the display apparatus 100 is not limited to a broadcasting image. For example, the display apparatus 100 may process various images such as a moving picture, a still picture, an application, an on screen display (OSD), a graphic user interface for various operation control, etc. based on a signal/data received from various image sources (not shown) of various formats to be displayed.

In accordance with one or more exemplary embodiments, the display apparatus 100 may be achieved by a smart TV. The smart TV may receive and display a broadcasting signal in real time, and may have a web browser function so that various contents can be searched and enjoyed through Internet and a convenient user environment may be provided for this while displaying the broadcasting signal in real time. Also, the smart TV may include an open-type software platform, and thus may provide interactive services to a user. Accordingly, the smart TV may provide a user with various contents, for example, an application providing a predetermined service through the open-type software platform. Such an application may be a program capable of providing various kinds of service, for example, which may include applications such as, for example, a social network service (SNS), finance, news, weather, a map, music, movie, a game, an E-book, etc.

As shown in FIG. 1, the display apparatus 100 may include an image receiver 110 to receive an image signal, an image processor 120 to process the image signal received by the image receiver 110, a display 130 to display an image based on the image signal processed by the image processor 120, an image communication camera 140 to receive an image for image communication, a sensor 150 to sense up/down positions of the image communication camera 140, a communicator 160 to communicate with external device, a storage 170 to store various data, a power supply 180 to supply electric power to various components of the display apparatus 100, and a controller 190 to control the display apparatus 100.

Also, the display apparatus 100 may further include a lens 141 through which an image passes, an image sensor 142 to sense an image passed through the lens 141, a voice sensor 143 to acquire voice of a user, and a voice converter 144 to convert input voice into an electric voice signal. The image processor 120 may further process an image acquired by the image sensor 142. Here, the lens 141, the image sensor 142, and the voice sensor 143 may be provided in the image communication camera 140.

In one or more exemplary embodiments, the voice sensor 143 may be provided at opposite lateral sides of the lens 141 of the image communication camera 140 (refer to FIGS. 3 and 4), but is not not limited thereto. Alternatively, for example, the voice sensor 143 may be provided at a predetermined position of the display apparatus 100 separately from the image communication camera 140. Also, the voice sensor 143 may be provided in a device separated from the display apparatus 100, for example, in a remote controller to receive a user input. If the voice sensor 143 is provided in the remote controller, the display apparatus 100 may receive the acquired voice from the remote controller through, for example, wireless communication of the communicator 160.

The image receiver 110 may receive an image signal and may transmit it to the image processor 120. The image receiver 110 may be implemented in various forms corresponding to formats of a received image signal and types of the display apparatus 100. For example, the image receiver 110 may wirelessly receive a radio frequency (RF) signal from a broadcasting station (not shown), or may receive an image signal by wire based on, for example, composite video, component video, super video, SCART, high definition multimedia interface (HDMI) standards, etc. The image receiver 110 may include a tuner to be tuned to a channel for the broadcasting signal if the image signal is the broadcasting signal.

Further, an image signal may be received from an external device. For example, an image signal may be received from an external device such as, for example, a personal computer, an audio/video device, a smart phone, a smart pad, tablet, etc. Also, an image signal may be based on data received through a network such as the Internet or the like. In this case, the display apparatus 100 may additionally include a network communicator (not shown) to perform communication through a network. Also, an image signal may be based on data stored in the storage 170 such as, for example, a flash memory, a hard disk drive, or other volatile or nonvolatile memory. The storage 170 may be provided inside or outside the display apparatus 100. When the storage 170 is provided outside the display apparatus 100, the display apparatus 100 may further include a connector (not shown) to which the storage 170 may be connected.

The image processor 120 may perform various processes preset for an image signal. The image processor 120 may apply such a process to an image signal and may output it to the display 130, so that the display 130 may display an image.

The processes performed by the image processor 120 may include, for example, decoding corresponding to various image formats, de-interlacing, frame refresh rate conversion, scaling, noise reduction for improving image quality, detail enhancement, line scanning, etc., but is not not limited thereto. The image processor 120 may be implemented as an individual module for independently performing each process, or by an integrated system-on-chip (SoC).

According to one or more embodiments, the image processor 120 may further process an image acquired by the image sensor 142 of the image communication camera 140, and the display 130 may display the processed image acquired by the image communication camera 140 together with an image acquired by an image communication camera of the other party and received through the communicator 160. Thus, a user may experience the image communication.

The display 130 may display an image based on an image signal processed by the image processor 120. The display 130 may be implemented as various display types such as liquid crystal, plasma, light-emitting diode, organic light-emitting diode, surface-conduction electron-emitter, carbon nano-tube, nano-crystal, etc., but is not not limited thereto.

The display 130 may include additional components corresponding to its type. For example, if the display 130 is a type of liquid crystal, the display 130 may include a liquid crystal display panel (not shown), a backlight unit (not shown) illuminating the liquid crystal display panel, and a panel driving substrate (not shown) for driving the liquid crystal display panel.

According to one or more embodiments, the display 130 may further display a user interface (UI) for displaying an operation state (e.g., a standby or activating state) of the image communication camera 140. The displayed UI will be described later in more detail with reference to FIGS. 11 to 13.

Meanwhile, the display apparatus 100 according to one or more embodiments may further include a separate operation indicator to indicate an operation state of the image communication camera 140. For example, the operation indicator may be implemented as a light emitting diode (LED) lamp which, for example, may indicate an activated state or a standby state with different colors. Also, the display apparatus 100 according to one or more embodiments may further include an audio output unit (e.g., a loudspeaker), which may output an audio signal separated from the image processor 120, to output sound for indicating the operation state of the image communication camera 140, thereby facilitating a user's recognition of the operating state.

The image sensor 142 provided in the image communication camera 140 may be implemented as, for example, a charge-coupled device (CCD)/complementary metal oxide semiconductor (CMOS) image sensor or the like.

The voice sensor 143 may sense the voice of a user, which may be achieved by a microphone.

The voice converter 144 may convert the voice sensed by the voice sensor 143 into an electric voice signal. The converted electric voice signal may have a pulse code modulation (PCM) state or compressed audio waveform. The voice converter 144 may be implemented as, for example, an analog/digital (A/D) converter that converts the sensed voice of a user into a digital signal, or the like.

Meanwhile, if the voice sensor 143 is a digital microphone, there is no need of separate A/D conversion and the voice converter 144 may be integrated into the voice sensor 143.

In one or more exemplary embodiments, the image communication camera 140 may have an up/down movable structure corresponding to a push input of a user.

Figure 3:
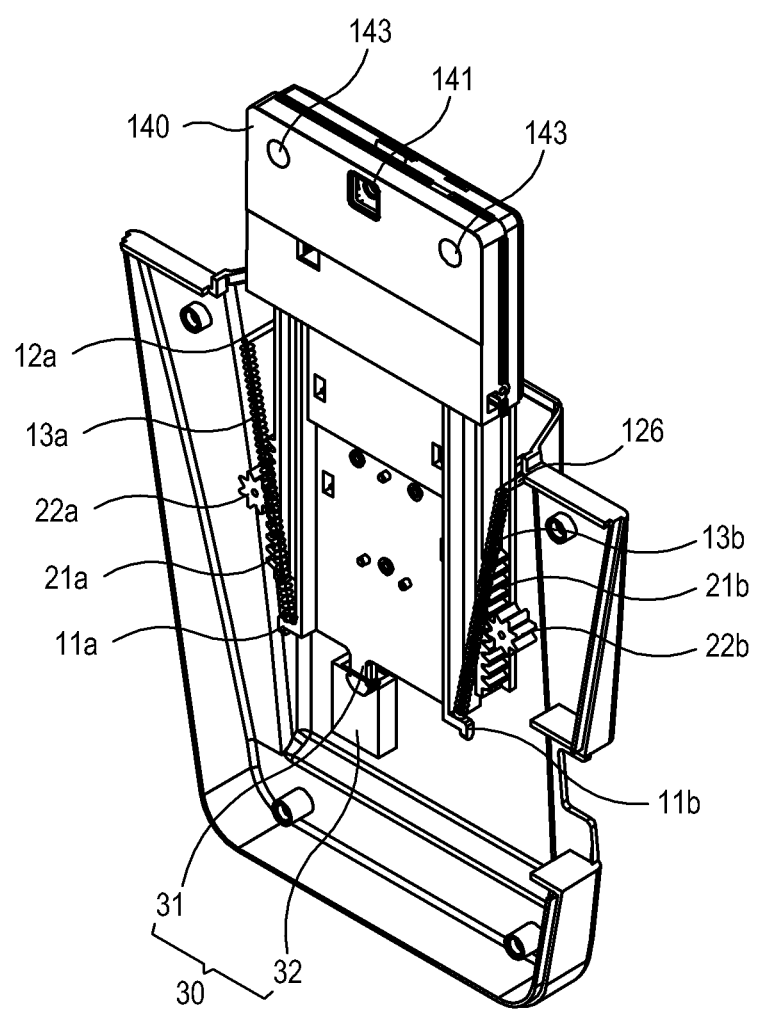
FIGS. 3 and 4 are perspective views for explaining a structure of an image communication camera according to one or more exemplary embodiments.
Figure 4:
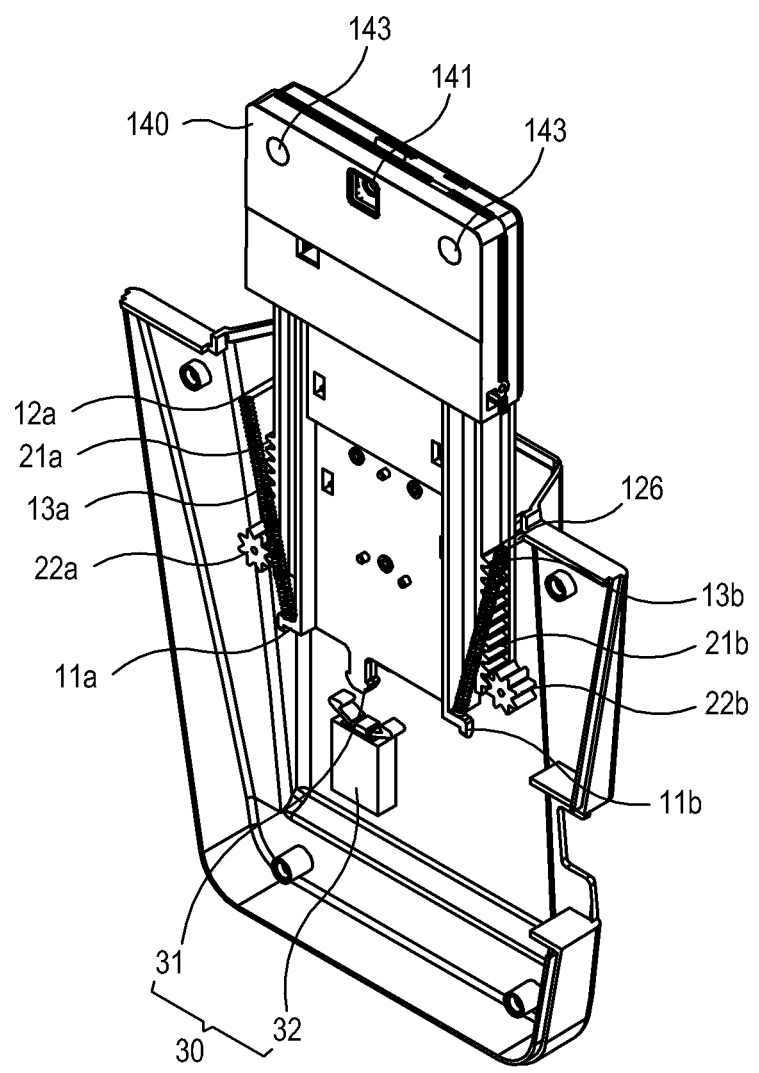
Figure 5:
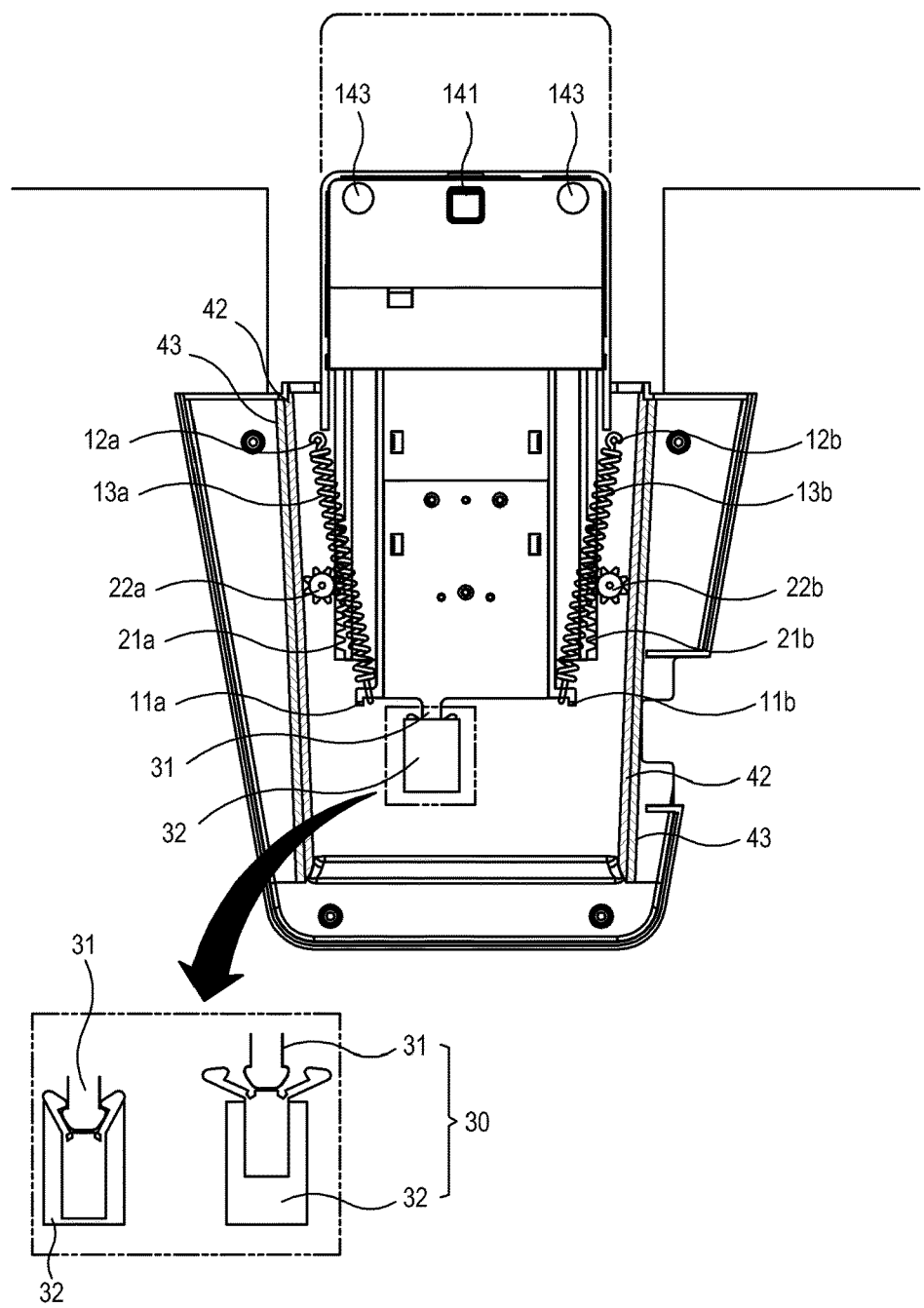
FIG. 5 is a partial cross-section view of an image communication camera, such as the image communication camera of FIGS. 3 and 4.
Figure 6:
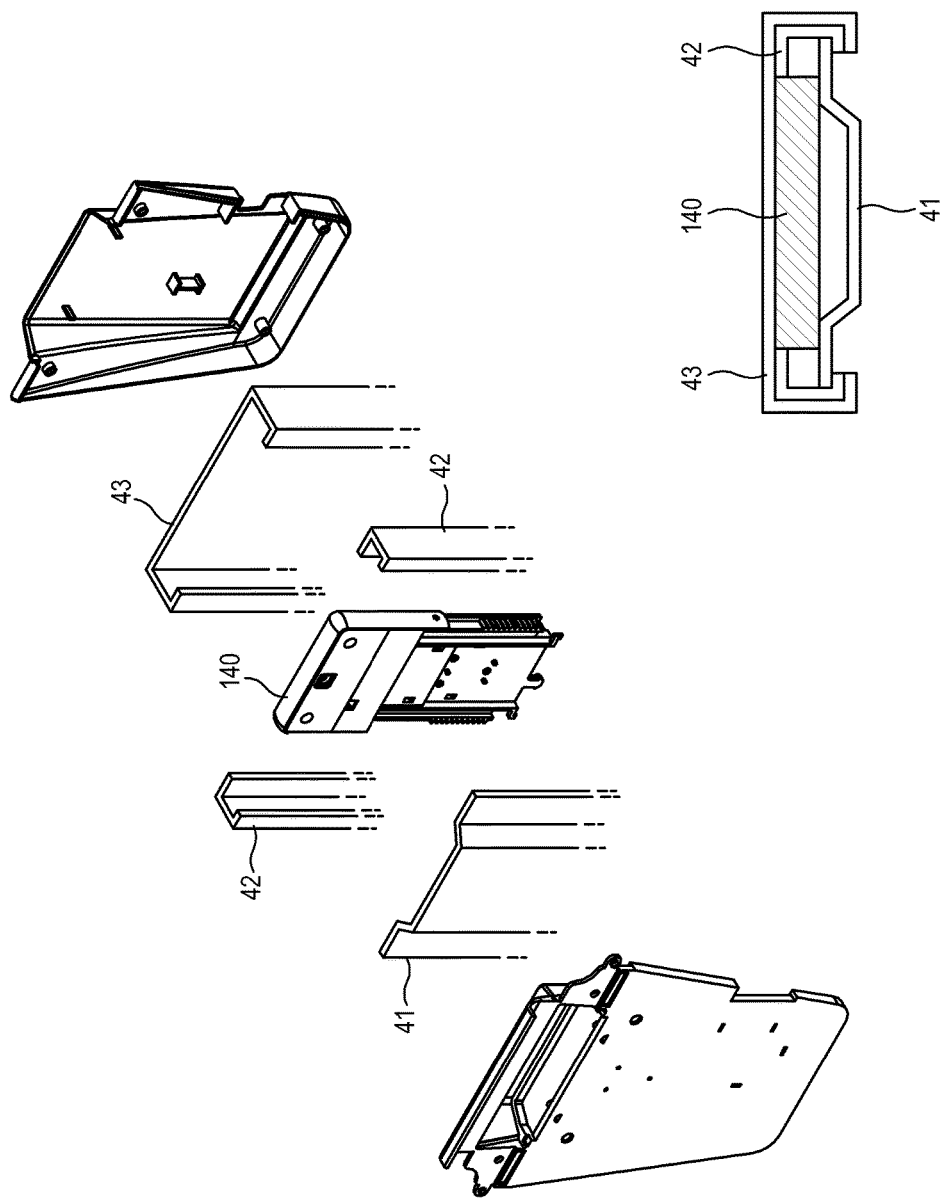
FIG. 6 is an exploded perspective view showing a structure by which an image communication camera may slide according to one or more exemplary embodiments.

FIGS. 3 and 4 are perspective views for explaining a structure of an image communication camera according to one or more exemplary embodiments, FIG. 5 is a partial cross-section view an image communication camera according to one or more exemplary embodiments such as the image communication camera of FIGS. 3 and 4, and FIG. 6 is an exploded perspective view showing a structure by which an image communication camera may slide according to one or more exemplary embodiments.

As shown in FIGS. 3 and 4, there may be provided an insertion portion 240, in which the image communication camera 140 may be inserted, and elastic members 13a and 13b, such as springs, for example, may be coupled to the image communication camera 140. To this end, the image communication camera 140 may include hooks 11a and 11b at opposite lower ends thereof, to which the elastic members 13a and 13b may be connected. The hooks 12a and 12b of the insertion portion 240 may be provided inside a guide portion 40 to be described later.

The image communication camera 140 of one or more exemplary embodiments may use the elasticity of the elastic members 13a and 13b as a driving force. That is, if the image communication camera 140 moves down, the elastic members 13a and 13b may be stretched as shown in FIG. 3. If the image communication camera 140 moves up, the elastic members 13a and 13b may be contracted as shown in FIG. 4. Thus, the image communication camera 140 may move up and down.

The image communication camera 140 may include a holding unit 30 at a bottom thereof, which may be coupled to the insertion portion 240 when the image communication camera 140 moves down and which may hold the image communication camera 140. Here, the holding unit 30, as shown in FIGS. 3 to 5, may include a latch 31 provided in the bottom of the image communication camera 140, and a latch holder 32 placed corresponding to the insertion portion 240 and holding the latch 31. As shown in FIG. 5, the latch 31 may be locked to and released from the latch holder 32 as the image communication camera 140 moves up and down.

In one or more embodiments, the image communication camera 140 may move up/down corresponding to a push input of a user as the elastic members 13a and 13b and the latch 31/latch holder 32 are operated. That is, the image communication camera 140 may move up and may protrude by a push input of a user from the state that it is accommodated in the insertion portion 240 and unexposed to the outside, and the image communication camera 140 may move down and be accommodated in the insertion portion 240 by the push input of a user from its protruding state.

Inside the insertion portion 240, the guide portion 40 may be provided as shown in FIG. 6, via which the image communication camera 140 may slide. In one or more embodiments, the guide portion 40 may be implemented as shown in FIG. 6 in the form that first to third guides 41, 42a, 42b, and 43 may be coupled.

Specifically, the second guide 42a and 42b may be coupled to the left and right sides of the first guide 41, and the third guide 43 may be coupled to the outside where the first guide 41 and the second guides 42a and 42b are assembled. The guide portion 40 may form an internal space in which the image communication camera 140 slides.

As shown in FIGS. 3 to 5, the guide portion 40 may be internally provided with gears 21a and 21b (e.g., rack gears), and the image communication camera 140 may be laterally provided with dampers 22a and 22b corresponding to the gears 21a and 21b, respectively, so that the dampers 22a and 22b may rotate while being engaged with the gears 21a and 21b as the image communication camera 140 moves up/down. With this rotation, it may be possible to maintain the speed of the up/down motion of the image communication camera 140 to be constant.

The sensor 150 may sense whether the image communication camera 140 is moved up or down based on the holding unit 30, for example, whether the latch 31 and the latch holder 32 are locked or released. Here, the sensor 150 may include a switching unit 155 that may be tuned on/off as the latch 31 and the latch holder 32 are locked or released, and that may output a signal.

Figure 7:
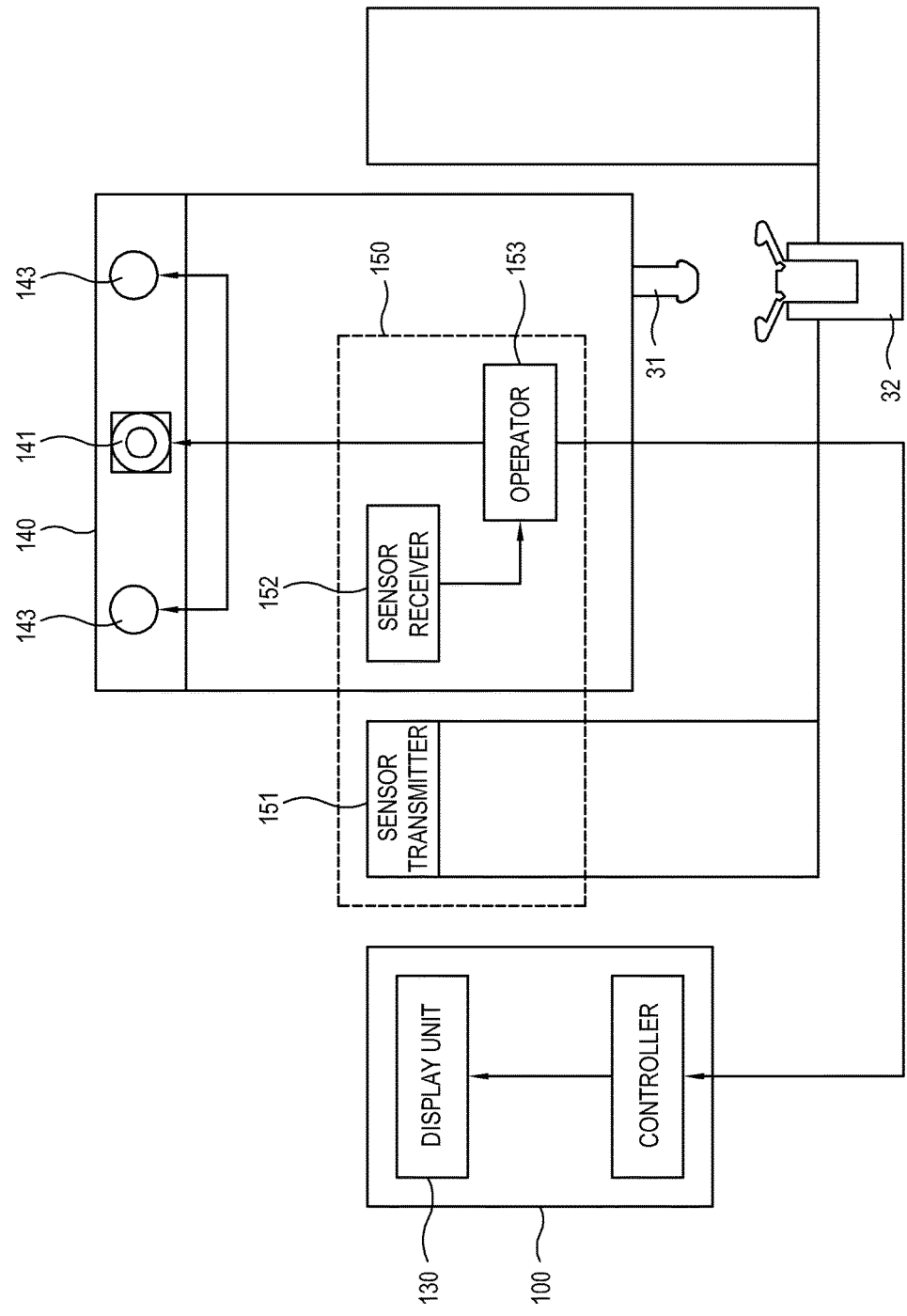
FIG. 7 is a view for explaining operation of a sensor according to one or more exemplary embodiments.
Figure 8:
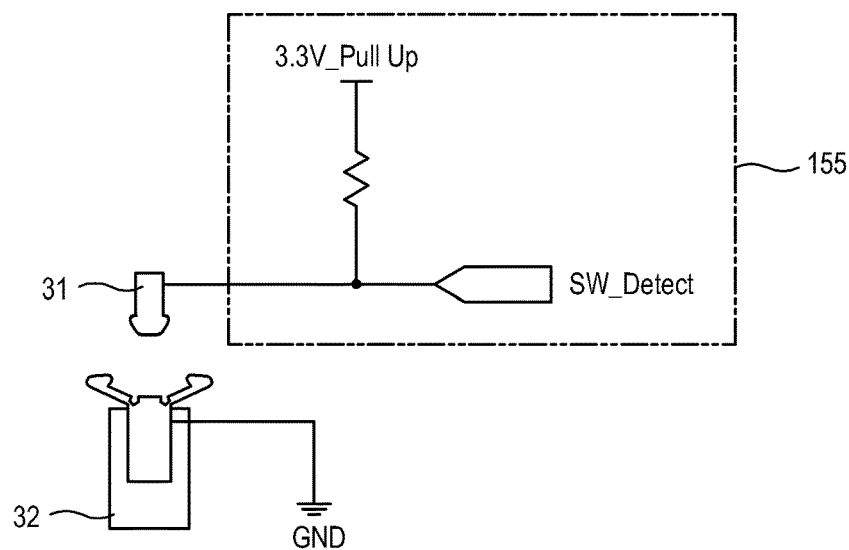
FIGS. 8 to 10 are views showing examples of a switching unit according to one or more exemplary embodiments.
Figure 9:
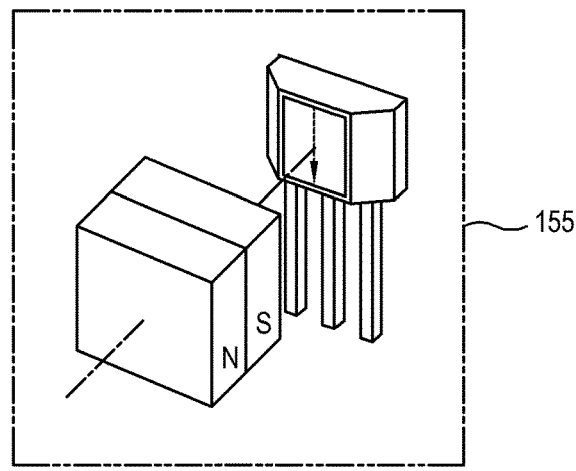
Figure 10:
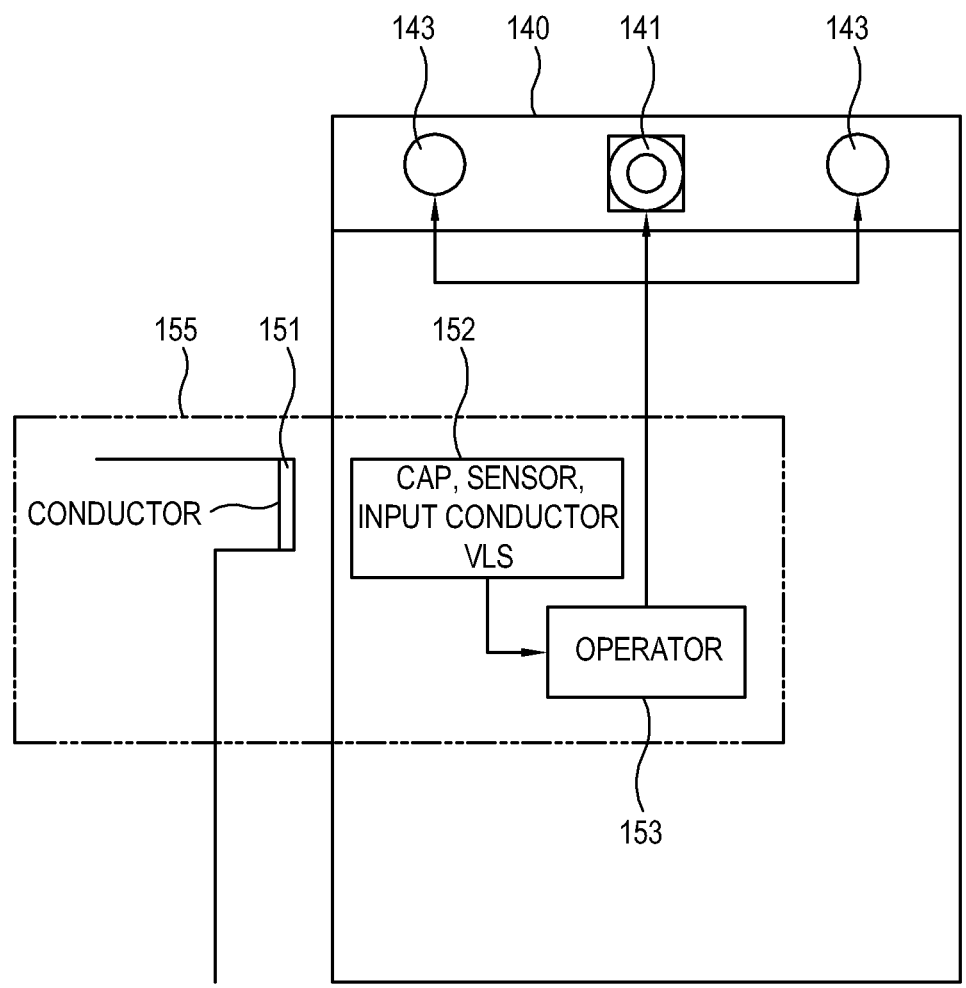

FIG. 7 is a view for explaining operation of a sensor according to one or more exemplary embodiments, and FIGS. 8 to 10 are views showing examples of a switching unit according to one or more exemplary embodiments.

As shown in FIG. 7, the sensor 150 may include a sensor transmitter 151 and a sensor receiver 152 for sensing the position of the image communication camera 140, and an operator 153 for outputting a signal to activate the image sensor 142 and the voice sensor 143 in accordance with the operation of the sensor transmitter 151 and the sensor receiver 152.

For example, if the image communication camera 140 is pushed down, the latch 31 and the latch holder 32 may be locked, the sensor transmitter 151 may transmit no signal to the sensor receiver 152, and the operator 153 may output a signal for making the image communication camera 140 and the voice sensor 143 change into a standby state.

In the same way, if the image communication camera 140 is pushed up, the latch 31 and the latch holder 32 may be released, the sensor transmitter 151 may transmit a signal to the sensor receiver 152, and the operator 153 may output a signal for activating the image communication camera 140 and the voice sensor 143. The sensor transmitter 151 may sense a predetermined voltage through the switching unit 155 of FIG. 8, and may output a signal to the sensor receiver 152.

The standby state may cut off electric power supplied from the power supply 180 to the image communication camera 140 and the voice sensor 143, and the activation state may supply electric power from the power supply 180 to the image communication camera 140 and the voice sensor 143.

The operator 153 may output a signal indicating the standby or activation state to the controller 190 (to be described later), and the controller 190 may control the supply of electric power from the power supply 180 based on the signal received from the operator 153.

Besides sensing the voltage as shown in FIG. 8, the switching unit 155 may, for example, use a hall integrated circuit (IC) as shown in FIG. 9 or a capacitance sense switch employing a conductor as shown in FIG. 10. In these cases, although it is not shown, a lug switch, an infrared device, a luminance sensor, or the like various switches may be used.

The communicator 160 may communicate with peripheral devices. In one or more embodiments, the communicator 160 may include, for example, at least one of wireless communication modules for infrared communication, radio frequency, Zigbee, Bluetooth, etc.

In this one or more embodiments, the communicator 160 may receive a voice signal input to the voice sensor 143 if the voice sensor 143 is provided in an external device (e.g., a remote controller) separated from the display apparatus 100. Also, the communicator 160 may transmit a command for turning off the voice sensor 143 provided in the external device when the image communication camera 140 moves down.

Meanwhile, under control of the controller 190, the communicator 160 in one or more embodiments may transmit a message about the operation states of the image communication camera 140 and the voice sensor 143 to an external terminal, e.g., to a mobile phone. Thus, a user may be able to recognize the operation states of the image communication camera 140 and the voice sensor 143 through the terminal, and prevent his/her privacy from unnecessary exposure.

Under control of the controller 190, the storage 170 may store data without any limitation. The storage 170 may be implemented as, for example, a flash memory, a hard disk drive or the like volatile or nonvolatile storage medium. The controller 190 may access the storage 170 and may read/record/modify/delete/update the data stored in the storage 170.

For instance, the data stored in the storage 170 may include, for example, an operating system for driving the display apparatus 100, various applications executable in this operating system, video data, appendix data, etc.

In one or more embodiments, the storage 170 may further store, for example, information about the current operation state of the image communication camera 140, information about data displayed on the display 130 in accordance with the operation state of the image communication camera 140, data for performing the image communication, or the like various data.

The power supply 180 may supply electric power to various components constituting the display apparatus 100. The power supply 180 may convert commercial alternating current (AC) power from the outside into electric power to be supplied to the components of the display apparatus 100, which may be achieved, for example, by way of a Switching Mode Power Supply (SMPS).

The controller 190 may perform control for the components of the display apparatus 100. For example, the controller 190 may control the operations of the display apparatus 100 by performing the image processing of the image processor 120 and a control operation corresponding to a command from a remote controller. For example, the controller 190 may be implemented in the form of a central processing unit (CPU) and software.

The controller 190 may control the electric power supplied from the power supply 180 to the image communication camera 140 in accordance with sensing results of the sensor 150. For example, in accordance with signals output from the sensor 150, the controller 190 may supply electric power when the image communication camera 140 is moved up and may cut off electric power when the image communication camera 140 is moved down.

According to one or more embodiments, the controller 190 may control the display 130 to display a user interface (UI) showing the operation states (activation or standby states) of the image communication camera 140 in accordance with the supply or cut-off of the electric power.

Figure 11:
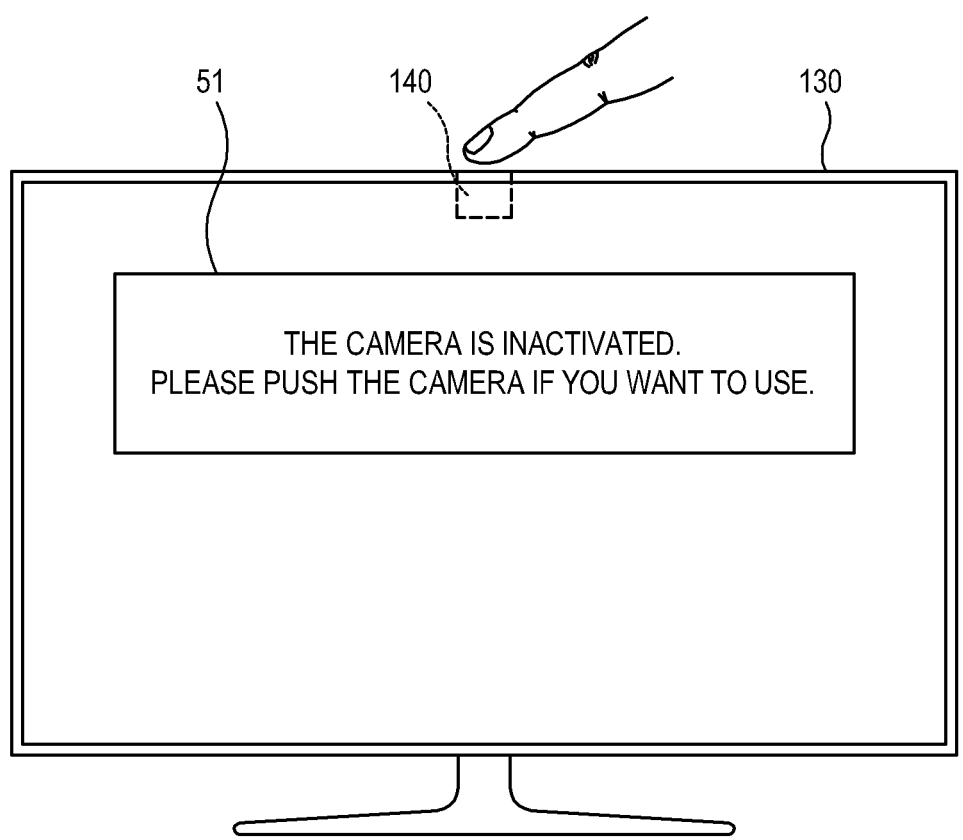
FIGS. 11 to 13 are views showing examples of a user interface (UI) displayed on a display according to one or more exemplary embodiments.
Figure 12:
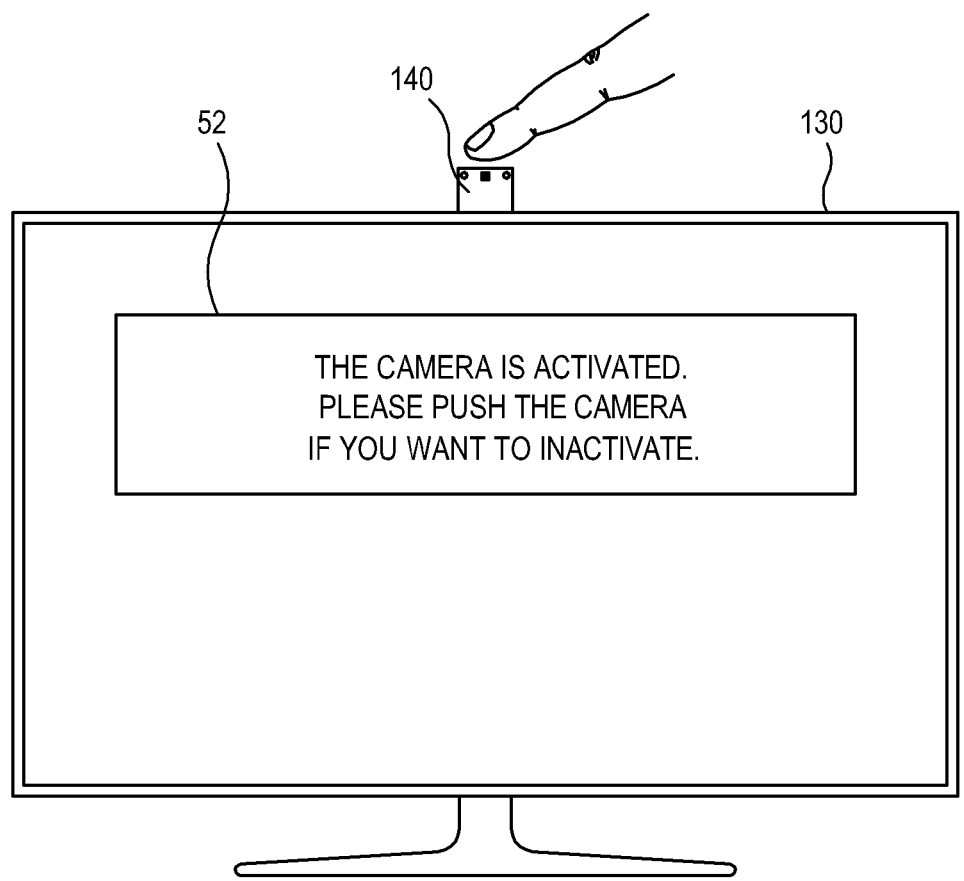
Figure 13:
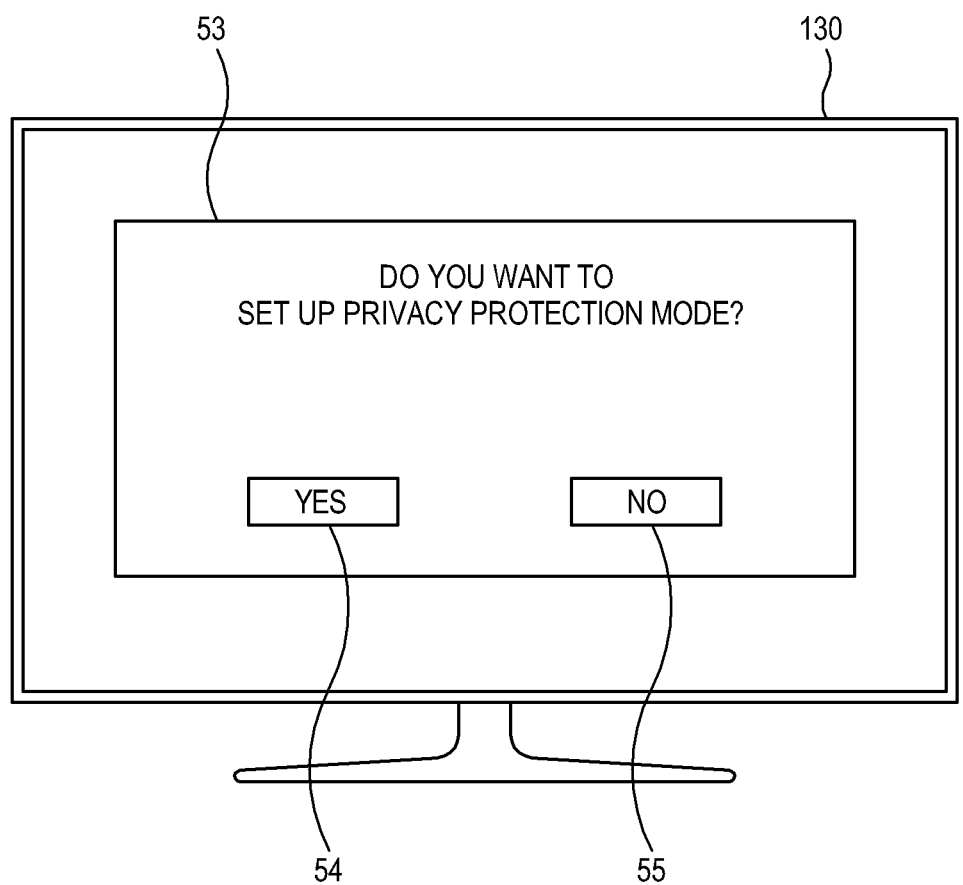

FIGS. 11 to 13 are views showing examples of a user interface (UI) displayed on a display according to one or more exemplary embodiments.

As shown in FIG. 11, the controller 190 may output a message 51 about the inactivation state (standby state) of the image communication camera 140 if it is sensed that the image communication camera 140 is moved down. A user may check the displayed message 51, and may push the upper portion of the image communication camera 140 when the user wants to do image communication, thereby possibly activating the image communication camera 140.

Likewise, as shown in FIG. 12, the controller 190 may output a message 52 about the activation state of the image communication camera 140 if it is sensed that the image communication camera 140 is moved up. In the activation state, the image communication camera 140 and the microphone 143 may be supplied with electric power, and untended exposure of a user's privacy may occur. Thus, the user may check the displayed message 52, and may push the upper portion of the image communication camera 140, thereby possibly deactivating the image communication camera 140.

Meanwhile, a user may select the display apparatus 100 among menu items, and set up whether to supply the electric power to the image communication camera 140 and the microphone 143. For example, if a user selects the privacy protection mode among the menu items, a message 53 as shown in FIG. 13 may be displayed, and the user may control a user input unit such as the remote controller to select one of selection items 54 and 55. If selection item 54 is selected, privacy protection mode may be set up.

The controller 190 may enter a sleep mode if the image communication camera 140 is moved down. Here, sleep mode indicates that some components of the display apparatus 100 enter a standby state to reduce power consumption. In sleep mode, the electric power supplied to the image communication camera 140 and the voice sensor 143 may be cut off, and the minimum components for operating the display apparatus 100 may receive the electric power.

According to one or more embodiments, the controller 190 may turn on the voice sensor 143 (e.g., microphone) if the image communication camera 140 is pushed up in the state that the display apparatus 100 (e.g., TV) is turned off. When the microphone senses voice, the controller 190 may inform a user of the sensed voice input through, for example, sound, the terminal, etc. Thus, a user may turn on the TV including the image communication camera 140 and may make the image communication.

The following Table 1 shows how electric power is supplied according to one or more embodiments.

TABLE 1

|  |  | Camera | microphone |
|---|---|---|---|
| push up | TV on | on | on |
| push down | TV on | off | off |
| push up | TV off | off | on |
| push down | TV off | off | off |

Below, a control method of the display apparatus according to one or more embodiments will be described with reference to the accompanying drawing.

Figure 14:
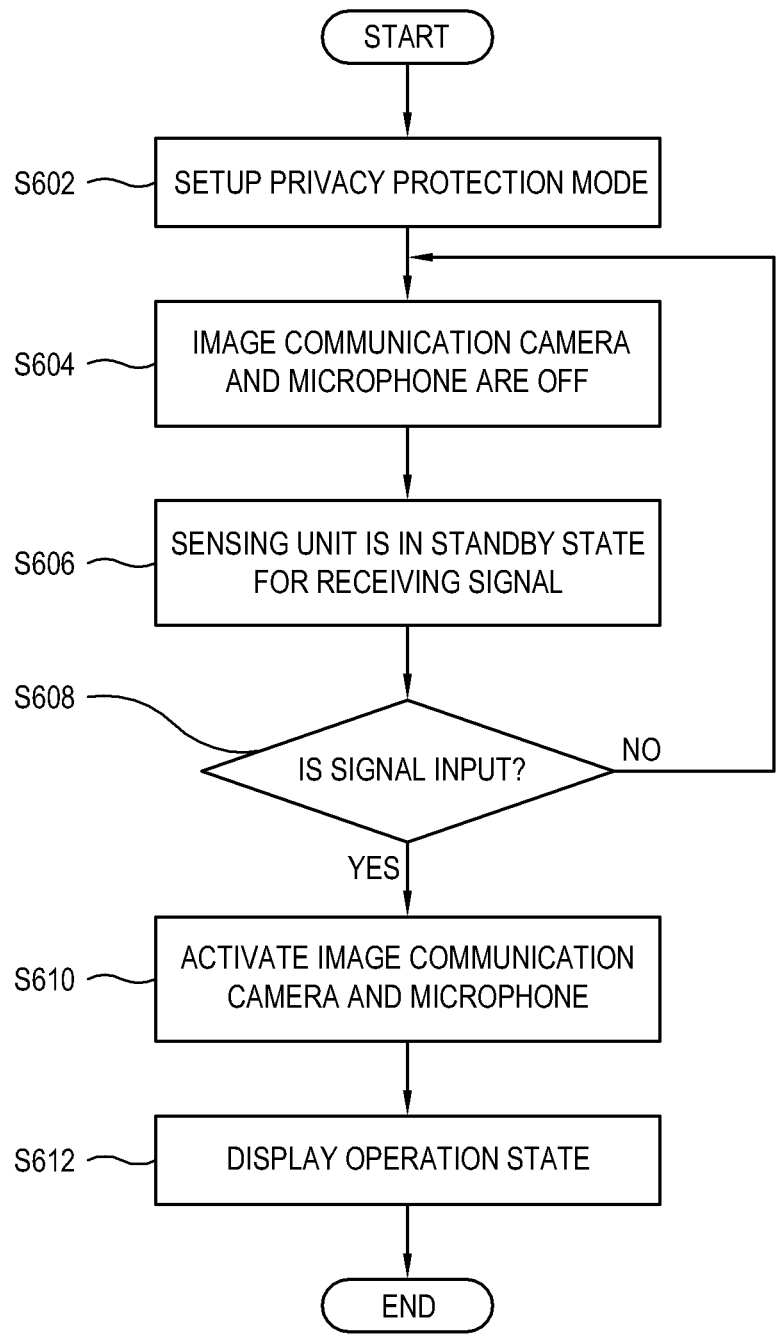
FIG. 14 is a flowchart showing a control method of a display apparatus according to one or more exemplary embodiments.

FIG. 14 is a flowchart showing a control method of a display apparatus according to one or more exemplary embodiments.

As shown in FIG. 14, a user may select a menu item as shown in FIG. 13 and set up to implement the privacy protection mode (S602).

Under the privacy protection mode set up at S602, the image communication camera 140 may be moved down and inserted in the insertion portion 240, and thus the image communication camera 140 and the microphone (voice sensor) 143 may be turned off and supplied with no electric power (S604).

The sensor 150 may enter a standby state in which the up/down sliding of the image communication camera 140 may be be detected (S606).

Further, the sensor 150 may sense whether the image communication camera 140 is moved up and a signal for activating the image communication is input (S608).

If the input of the signal is sensed at S608, the controller 190 may control the electric power to be supplied to the image communication camera 140, and may activate the image communication (S610).

Further, the controller 190 may display a UI showing the operation states, i.e., the activation states of the image communication camera 140 and the microphone 143 (S612).

FIG. 14 shows a case in which the image communication camera 140 is activated by being pushed up, but is not limited thereto. Alternatively, for example, the foregoing may also be applied when the image communication camera 140 enters the standby state by the push-down.

As above, according to one or more embodiments, it may be possible to determine whether the image communication camera and the microphone operate or not based on the up/down position of the image communication camera, so that home observation unintended by a user may be be prevented, thereby decreasing the invasion of privacy and preventing electric power from being wastefully supplied to the components not in use.

Also, a user may be informed of whether the image communication camera and the microphone operate or not through, for example, the UI, the operation indicator, a sound output unit, etc. thereby increasing a user's convenience in recognizing the operation of the image communication camera and the microphone.

Further, the image communication camera may be conveniently used because it is pushed up/down with the elastic member and the holding unit, and may be moved up and down at stable and constant speed because of the sliding structure using the guide and the gear/damper structure.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An electronic apparatus comprising:
   a body;
   a camera configured to generate an image signal, and the camera being movable to a first position that places a lens of the camera in an unobstructed position with respect to the body and a second position that places the lens of the camera in an obstructed position with respect to the body;
   a power supply configured to supply electric power to the camera; and
   a controller configured:
      in response to sensing that the camera is moved to the second position, to output a first message in which a current state of the camera is indicated, the first message stating the camera is in a closed state at the second position while the lens of the camera is in the obstructed position with respect to the body, and
      in response to sensing that the camera is moved to the first position, to output a second message in which the current state of the camera is indicated, the second message stating the camera is in an open state at the first position while the lens of the camera is in the unobstructed position with respect to the body.

2. The electronic apparatus according to claim 1, wherein the controller is configured:
to receive a user input for requesting a predefined operation of the camera,
to output the first message indicating that the camera is in the second position when the camera is in the second position, and
to control the camera to perform the predefined operation of the camera based on the user input when the camera is in the first position.

3. The electronic apparatus according to claim 1, wherein the controller is configured to control the camera to disable generation of the image signal, such that the power supply supplies less electric power to the camera, when the camera is in the second position, than is supplied to the camera when the camera is in the first position.

4. The electronic apparatus according to claim 1, wherein the controller is configured:
to control the power supply to supply the electric power to the camera when the camera is in the first position, and
to cut off the electric power to the camera when the camera is in the second position.

5. The electronic apparatus according to claim 1, wherein the controller is configured to control the camera to enter into a sleep mode, such that the power supply supplies electric power that is less than a normal mode to the electronic apparatus, when the camera is in the second position.

6. The electronic apparatus according to claim 1, further comprising:
a voice sensor configured to receive a voice of a user, wherein the controller is configured:
to control the power supply to supply the electric power to the voice sensor when the camera is in the first position, and
to cut off the electric power to the voice sensor when the camera is in the second position.

7. The electronic apparatus according to claim 6, wherein the controller is configured:
to control the camera to receive the voice of the user when the camera is in the first position, and
to control the camera to disable to receive the voice of the user and output the first message indicating that the camera is in the second position when the camera is in the second position.

8. The electronic apparatus according to claim 1, further comprising:
a display provided on the body to display an image, wherein the controller is configured to control the display to display the first message and the second message, and
wherein the controller is configured to control the display to display a user interface (UI) showing that the image signal is capable of being generated or showing that the image signal has been disabled.

9. The electronic apparatus according to claim 1, wherein the controller is configured to transmit a message indicating whether the camera is able to generate the image signal to an external device.

10. A method of controlling an electronic apparatus including a body and a camera, the method comprising:
receiving a user input for requesting a predefined operation of the camera;
determining whether the camera is in a first position that places a lens of the camera in an unobstructed position with respect to the body;
determining whether the camera is in a second position that places the lens of the camera in an obstructed position with respect to the body; and
controlling the camera to perform the predefined operation of the camera based on the received user input when the camera is determined to be in the first position, and
the controlling outputs, in response to sensing that the camera is moved to the second position, a first message in which a current state of the camera is indicated, the first message stating the camera is in a closed state at the second position while the lens of the camera is in the obstructed position with respect to the body, and
the controlling outputs, in response to sensing that the camera is moved to the first position, a second message in which the current state of the camera is indicated, the second message stating the camera is in an open state at the first position while the lens of the camera is in the unobstructed position with respect to the body.

11. The method according to claim 10, further comprising:
supplying electric power to the camera when the camera is determined to be in the first position; and
cutting off the electric power supplied to the camera when the camera is determined to be in the second position.

12. The method according to claim 10, further comprising entering into a sleep mode, such that less electric power is supplied to the camera than an amount of electric power supplied to the camera during a normal mode to the electronic apparatus, when the camera is in the second position.

13. The method according to claim 10, wherein the electronic apparatus comprises a voice sensor and the method further comprises:
supplying electric power to the voice sensor when the camera is in the first position, and cutting off the electric power to the voice sensor when the camera is in the second position.

14. The method according to claim 13, further comprising controlling the camera to be able to receive a voice of the user when the camera is in the first position; and
controlling the camera to disable receiving of the voice of the user and outputting the first message indicating that the camera is in the second position, when the camera is in the second position.

15. The method according to claim 10, further comprising:
displaying a user interface (UI) showing whether or not the camera is able to generate the image signal, and
the controlling controls a display to display the first message and the second message.

16. The method according to claim 10, further comprising transmitting a message indicating whether the camera is able to generate the image signal to an external device.

17. An electronic apparatus comprising:
a body;
a camera configured to generate an image signal, and the camera being manually movable to a first position that places a lens of the camera in an unobstructed position with respect to the body and being manually moveable to a second position that places the camera in an obstructed position with respect to the body;
a voice sensor; and
a controller to control the camera to be able to generate the image signal when the camera is in the first position and to control the camera to be disabled to generate the image signal when the camera is in the second position,
wherein in response to sensing that the camera is moved to the second position, the controller outputs a first message in which a current state of the camera is indicated, the first message stating the camera is in a closed state at the second position while the lens of the camera is in the obstructed position with respect to the body, and
in response to sensing that the camera is moved to the first position, the controller outputs a second message in which the current state of the camera is indicated, the second message stating the camera is in an open state at the first position while the lens of the camera is in the unobstructed position with respect to the body,
wherein the voice sensor is supplied electric power when the camera is in the first position, and cut off the electric power when the camera is in the second position.

18. The electronic apparatus according to claim 17,
wherein the controller controls a power supply to cut off the electric power to the camera when the camera is in the second position.

19. The electronic apparatus according to claim 17,
wherein the controller controls to enter into a sleep mode, such that electric power less than a normal mode is supplied to the electronic apparatus, when the camera is in the second position.

20. The electronic apparatus according to claim 17, further comprising:
a display provided on the body to display an image,
wherein the controller is configured to control the display to display the first message and the second message, and
wherein the controller controls the display to display a user interface (UI) showing whether the camera is able to generate the image signal.

* * * * *